Sept. 26, 1933.   K. W. MOORE   1,928,184
SUN VISOR FOR AUTOMOBILES
Filed Sept. 22, 1932
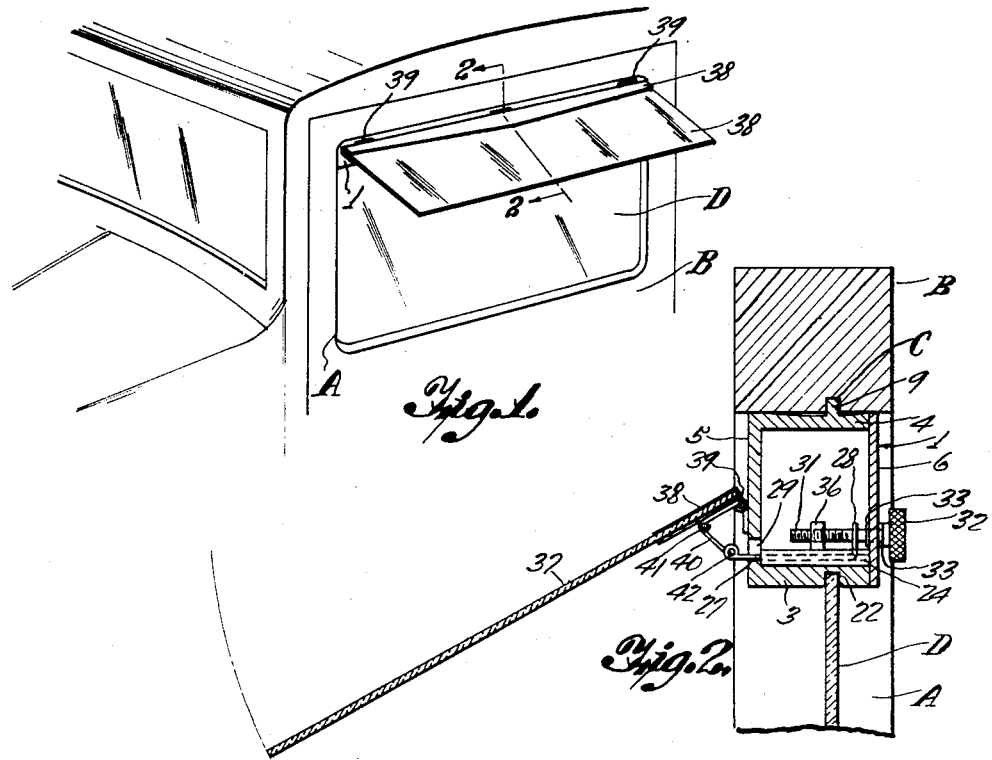
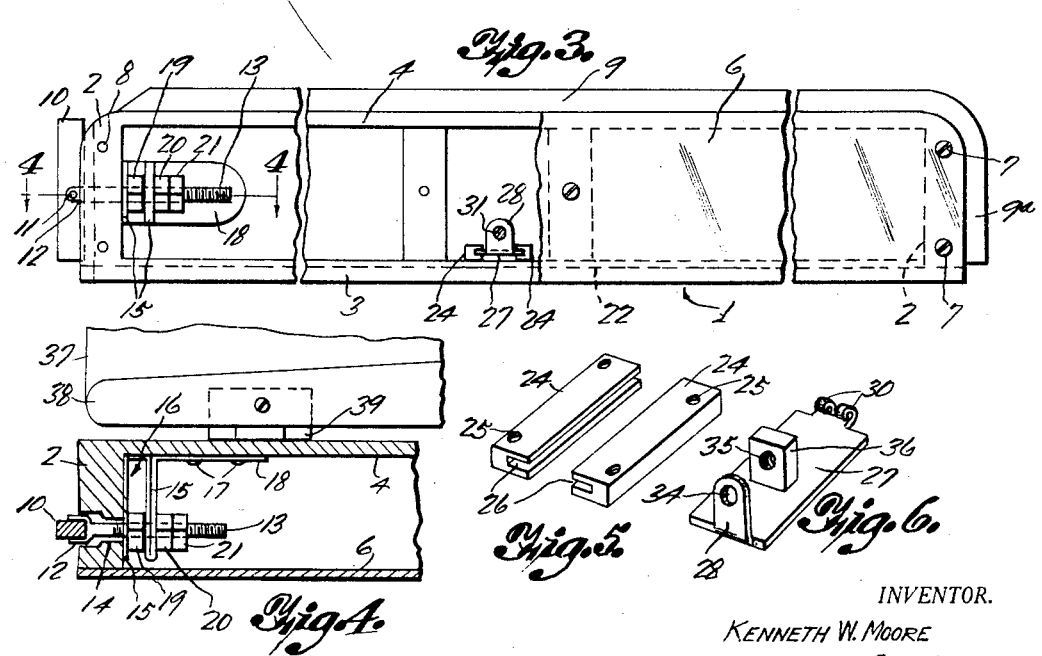
INVENTOR.
KENNETH W. MOORE
BY Adam E. Fisher
ATTORNEY.

Patented Sept. 26, 1933

1,928,184

UNITED STATES PATENT OFFICE 1,928,184

SUN VISOR FOR AUTOMOBILES

Kenneth W. Moore, Dearborn, Mich.

Application September 22, 1932
Serial No. 634,299

4 Claims. (Cl. 296—95)

My invention relates to improvements in sun visors for automobiles.

The main object of my invention is to provide a simple and efficient visor for mounting in the window opening of an automobile door to shield the occupants of the automobile from sun glare or from the elements.

Another object is to provide a visor including a housing for mounting in the window groove of the automobile door and having a groove in its underside to receive the upper margin of the window glass, the visor shield being hinged to the outer side of the housing, and means in the housing and operable from the interior of the automobile, for swinging the visor to any desired angle or position.

With these and other objects in view, the invention resides in the novel construction and arrangement of parts as hereinafter set forth and claimed, reference being had to the accompanying drawing, wherein Figure 1 is a perspective view of the visor as mounted in the front door of an automobile, only a part of the latter being shown.

Figure 2 is an enlarged vertical cross section through the visor and housing and a part of the automobile door frame.

Figure 3 is an inside elevation of the housing, partly broken away and with a part of the cover removed.

Figure 4 is a horizontal section along the line 4—4 in Figure 3.

Figure 5 is a perspective view of the guides for the visor operating plate.

Figure 6 is a perspective view of the visor operating plate.

Referring now more particularly to the drawing, my invention comprises a housing 1 of elongated, rectangular and box-like form, including the ends 2, bottom 3, top 4, outer side 5 and cover 6, the latter being removably mounted by screws 7 threaded at 8 in the ends 2. The shape and size of this housing 1 will, of course, vary according to the corresponding characteristics of the automobile window in which it is to be mounted. A rib 9 is provided on and preferably, though not necessarily, formed integrally with the top 4 of the housing 1, and extends longitudinally thereon from end to end. At one end the rib 9 has an extension 9a turned down over and on the end 2 of the housing but terminating short of the lower edge thereof. A locking key 10 similar in cross-sectional shape and size to the rib 9 but of a length substantially that of the extension 9a, is pivotally mounted at 11 intermediate its ends in the fork 12 of an adjusting bolt 13, which is slidably extended through a bore 14 in the end 2 of the housing remote from the end bearing the rib extension 9a. At its inner end the adjusting bolt 13 passes loosely through the spaced outstanding ears 15 of a bracket 16, which is mounted in the housing 1 and secured to the side 5 thereof by screws 17 through its base 18. A nut 19 is threaded on the bolt 13 between the ears 15 and an additional nut 20 and lock nut 21 are threaded on the end of the bolt inwardly of the inner ear 15, the arrangement being such that the bolt and, of course, the locking key 10 attached thereto, may be projected outwardly and endwise from the case or retracted by properly turning the nuts 19 and 20. The bolt and key may then be secured in their adjusted position by means of the lock nut 21. The housing 1 has a longitudinally extended glass receiving groove 22 in the underside of its bottom 3.

The housing 1 thus constructed may be mounted at the top of the window opening A of the automobile door B, and the rib 9 and extension 9a be inserted in the usual glass receiving channel C around this opening. The locking key 10 may then be projected laterally into the channel C in the side of the opening A and the housing will be securely held in place therein as shown. If desired, the window glass D may be run up so that its upper margin enters the glass receiving groove 22 in the housing and the entire window opening A will thus be closed for protection from wind or rain.

A pair of spaced and parallel guides 24 are mounted by screws 25 in the housing 1 laterally across the bottom 3 thereof, and these guides have channels 26 cut in their inner faces to slidably receive the margins of a visor operating plate 27 mounted between the guides. The visor operating plate 27 has an upwardly turned ear 28 at its intended inner end and is adapted to project at its outer end through an aperture 29 cut in the side 5 of the housing, this outer end of the plate having hinge eyes 30 as shown. A visor operating screw 31 having a knurled head 32 is journaled through the cover 6 and is secured against longitudinal or axial displacement therein by collars 33. The inner threaded end of this operating screw 31 passes loosely through an aperture 34 in the ear 28 on the visor operating plate 27 and is threaded through the threaded bore 35 of a block 36 secured on this plate 27. The plate 27 may thus be moved outward or drawn inward by turning the operating screw 31.

A visor 37 of suitable shape and size and of some translucent glare diffusing glass is provided and one margin is bound by a U-shaped clamp 38 and is hinged by hinges 39 to the outer face of the housing side 5 above the aperture 29 therein. A connecting link 40 is hinged at 41 to this clamp 38 at a medial point and is hinged at 42 to the hinge eyes 30 on the outer end of the visor operatng plate 27.

In use, the visor 37 may be adjusted to any angle from a point lying substantially flat alongside the window D to a horizontal position simply by properly rotating the operating screw 31 by its head 32, this operation being performed from within the automobile and with the window up or down. The device may be applied to any or all of the doors of the automobiles desired, and of course may be made in any shape or size to fit the doors.

While I have herein set forth a certain preferred embodiment of my invention, it is understood that I may vary from the same in minor details, so as best to construct a practical device for the purposes intended, not departing from the spirit of the invention and within the scope of the appended claims.

I claim:

1. In a device of the kind described, a housing, a rib on the uper side and one end of the housing, a locking key adjustably mounted on the other end of the housing, means for extending or retracting the locking key, a visor hinged on the housing, and means in the housing for adjusting and swinging the visor.

2. In a device of the kind described, a housing having a longitudinal groove in its underside, a rib on the upper side and one end of the housing, a bolt slidably mounted through the other end of the housing, adjusting nuts on the inner end of the bolt, a locking key mounted on the outer end of the bolt, a visor hinged on the housing, guides in the housing, a visor operating plate slidably mounted in the guides, a link connecting the visor and the operating plate, and means for moving the operating plate in its guides for adjusting the visor.

3. In a device of the kind described, a housing having a longitudinal groove in its underside, a rib on the upper side and one end of the housing, a bolt slidably mounted through the other end of the housing, adjusting nuts on the inner end of the bolt, a locking key mounted on the outer end of the bolt, a visor hinged on the housing, guides in the housing, a visor operating plate slidably mounted in the guides, a link connecting the visor and the operating plate, means for moving the operating plate in its guides for adjusting the visor, the said means comprising a threaded block secured on the visor operating plate, and an operating screw threaded through the said block.

4. In a device of the kind described, a housing adapted for mounting in the window opening of an automobile door and having a groove in its underside to receive the glass in the said window opening, a rib on the upper side and one end of the housing adapted to enter the glass channel in the window opening, a locking key adjustably mounted in the other end of the housing, means for projecting the locking key outward into the glass channel in the said window opening, a visor hinged on the outer side of the housing, and means operable on the inner side of the housing for swinging the said visor on its hinges.

KENNETH W. MOORE.